Figure 1:
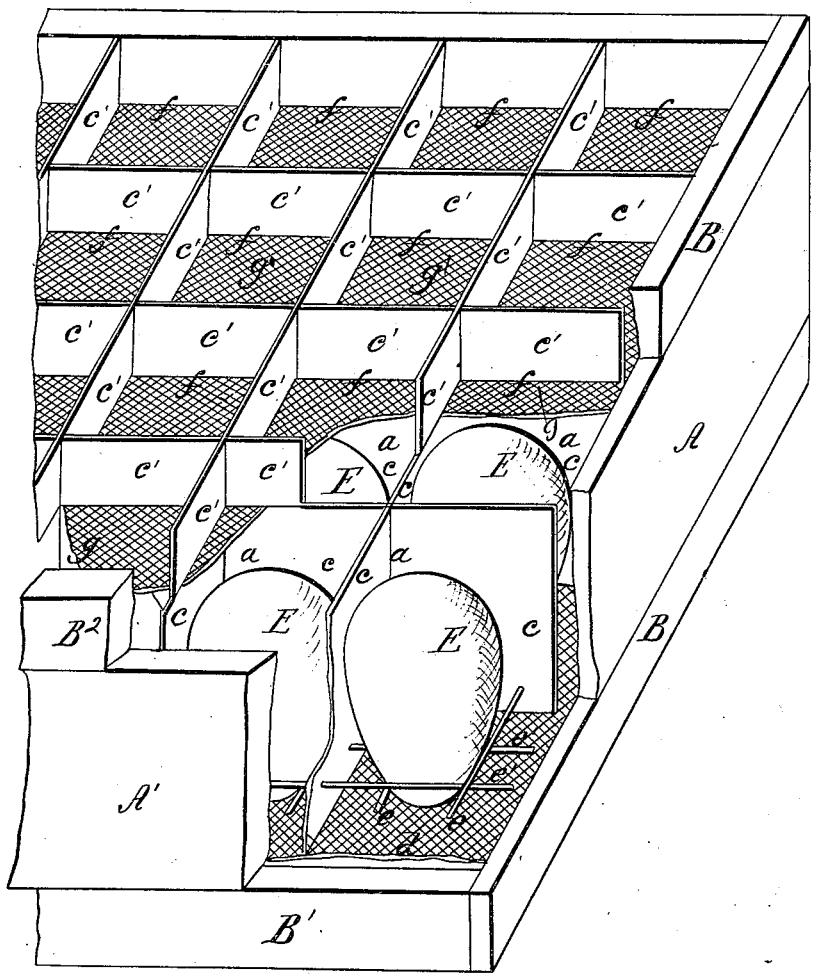

Dorn & Shibley.
Egg Carrier.
N°89,133. Patented Apr. 20, 1869.
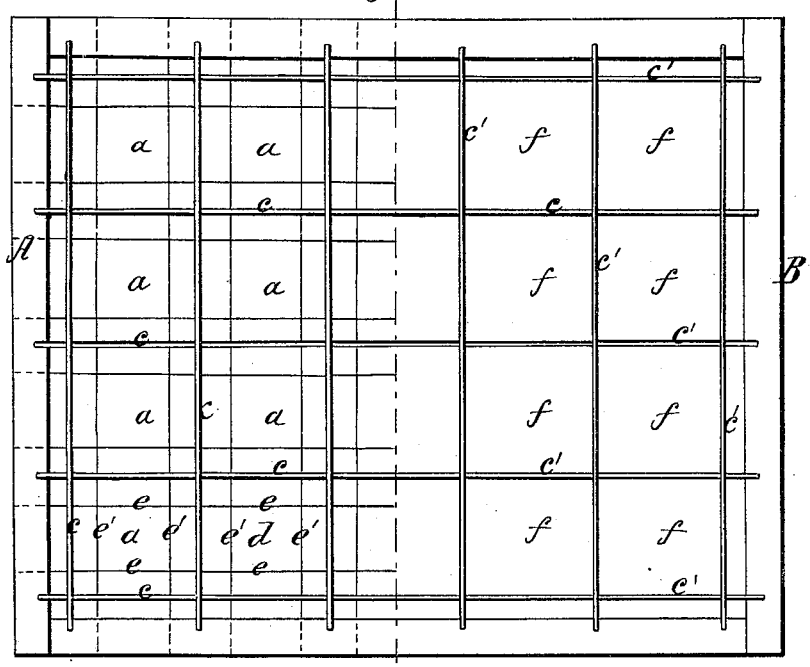
Fig. 1
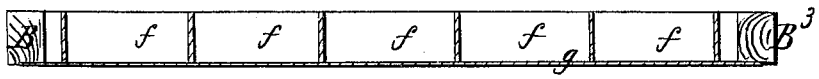
Fig. 2
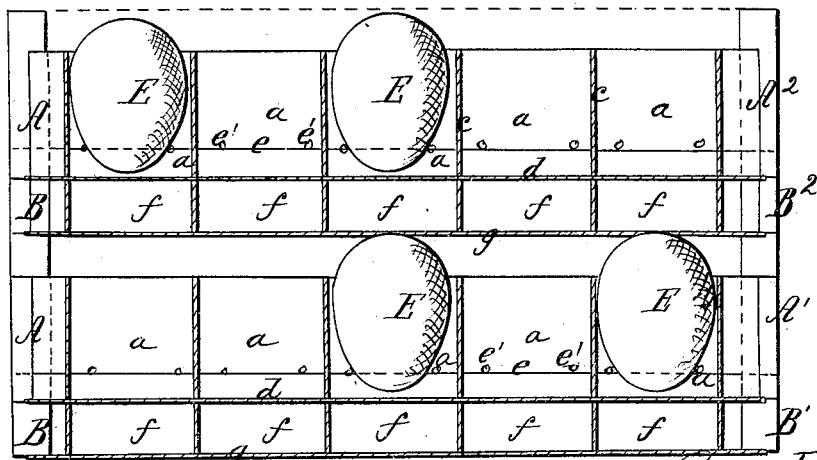
Witnesses:
L. G. Bancroft
D. H. Garrity
Inventors:
Geo. Dorn
John Shibley Dorn & Shibley.

Egg Carrier.

N° 89,133.    Patented Apr. 20, 1869.

Witnesses,

Inventors;
George Dorn
John Shibley
per Aexr. Selkirk Attorney
for Inventors

GEORGE DORN AND JOHN SHIBLEY, OF ALBANY, NEW YORK.

Letters Patent No. 89,133, dated April 20, 1869.

IMPROVEMENT IN EGG-CARRIERS.

The Schedule referred to in these Letters Patent and making part of the same.

*To all whom it may concern:*

Be it known that we, GEORGE DORN and JOHN SHIBLEY, of the city and county of Albany, State of New York, have invented a new and improved mode of constructing Egg-Carriers; and we do hereby declare that the following is a full, clear, and exact description thereof, reference being had to the accompanying drawings, making a part of this specification, and the letters of reference marked thereon, in which—

Figure 1, Plate I, represents a perspective view of a section of a tray with separators above and below.

Figure 2, with cords, represents a vertical view from top of tray.

Figure 2, without the cords, represents a vertical view from top of separator.

Figure 3 represents a cross-section through the trays and separators.

The nature of our invention consists in constructing a tray for holding eggs, with any number of small apartments, the size of which will admit the receiving the largest diameter of the egg.

The said small apartments are made by running, from side to side and from end to end, at right angles to each other, partitions of card, or pasteboard, or thin panel, sheet metal, or any other thin, light material.

Placed near the bottom edges of the said partitions, and through them, are cords, wire, rubber, or similar cord-like strips, woven so as to form one mesh in each apartment.

These cords, or their equivalents run from side to side and from end to end of the tray, and at right angles to each other, and are passed through the said partitions, as well as through the sides of the tray-frame.

The small ends of the eggs to be carried are to be set in the meshes formed by the cords that cross each other in each compartment.

The lower side, or bottom of the tray is covered with any suitable canvas.

We also use a separator, which consists of a light frame, of size equal to the frame of the tray, but only about three-quarters of an inch in depth. This separator is constructed with apartments corresponding in size with those of the tray, and which are formed by partitions of similar materials as those of the tray. They have no cords, but have one side covered with canvas. These separators are to be placed between the trays with their canvas-covered sides down, and when thus placed the eggs in the tray below will be prevented from bounding up by any jolt, and while the canvas on the under side of the tray above will rest on the open face of the separator below, will keep the eggs from sinking down and striking the eggs beneath.

To enable others skilled in the art to make and use our invention, we will proceed to describe it, in reference to the drawings and their letters of reference, the same letters indicating like parts.

In the drawings—

A represents the frame of a tray.

The said tray is furnished with a number of apartments $a\ a\ a$, formed by the pasteboard or light panel partitions $c\ c\ c\ c$.

These partitions commence on a line even with the bottom edges of the tray frame A, and run up to within three quarters of an inch from the top, more or less.

At about three-eighths of an inch from the bottom edges of the said partitions is woven one set of meshes, about three-quarters of an inch square—one in the centre of each apartment. The said meshes are formed by the cords $e\ e\ E\ e'\ e'$ crossing each other at right angles.

A piece of canvas, $d$, is fastened to the bottom of the tray.

We also use a separator, B, which consists of a frame about three-quarters of an inch deep, and divided into apartments $f\ f\ f$ of the same size as $a$, in the tray, and is formed of like thin partitions $c'\ c'\ c'\ c'$.

One side of this separator is covered with canvas $g$.

The mode of operating this egg-carrier is as follows:

The separator $B^1$ is first put in the crate which is to hold the eggs to be carried, with its canvas side down, when tray $A^1$ is placed on it. Then separator $B^2$ is placed over the said tray $A^1$, with its canvas side down. The tray $A^2$ is then placed over separator $B^2$, and so on, alternating a separator and a tray, until the crate is filled, and when thus placed the eggs E, having been previously placed in their several individual apartments, are kept secure, being bounded on their sides by the partitions $c\ c\ c\ c$, and at the bottom by the cords $e\ e\ e'\ e'$ and canvas $d$ of the tray, and at the top by the canvas $g$ of the separator.

When the eggs E are to be removed from the tray A, the separator B is placed over the tray, with its canvas $g$ up, when the whole is inverted, and the tray A is removed, leaving the eggs E in the separator B, free to be handled easily.

Having described our invention, we do not claim the cords $e\ e'$ or their equivalents, as they are covered by George Dorn, in patent of August 18, 1868; but

What we claim, and desire to secure by Letters Patent, is—

1. A tray, A, constructed of pasteboard or light panel, as described, furnished with the holding cords $e\ e'$, arranged as described through the apartments $a\ a$, for the purposes set forth.

2. The canvas $d$, in combination with a tray A, furnished with the apartments $a\ a$ and the meshes described, as and for the purpose set forth and described.

3. The separator B, constructed with the apartments $f\ f$ and canvas $g$, as and for the purpose set forth, as specified.

GEO. DORN,
JOHN SHIBLEY.

Witnesses:
L. G. BANCROFT,
I. H. GARRILY.